United States Patent
Erickson

(10) Patent No.: US 8,458,340 B2
(45) Date of Patent: *Jun. 4, 2013

(54) DISTRIBUTED CACHE FOR STATE TRANSFER OPERATIONS

(75) Inventor: Rodger D. Erickson, Dunwoody, GA (US)

(73) Assignee: Aventail LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/252,170

(22) Filed: Oct. 3, 2011

(65) Prior Publication Data

US 2012/0084384 A1    Apr. 5, 2012

Related U.S. Application Data

(63) Continuation of application No. 12/694,198, filed on Jan. 26, 2010, now Pat. No. 8,032,642, which is a continuation of application No. 11/927,350, filed on Oct. 29, 2007, now Pat. No. 7,720,975, which is a continuation of application No. 09/783,147, filed on Feb. 13, 2001, now Pat. No. 7,383,329.

(51) Int. Cl.
   *G06F 15/173* (2006.01)

(52) U.S. Cl.
   USPC ............................................. 709/227

(58) Field of Classification Search
   USPC ................................. 709/223–227
   See application file for complete search history.

(56) References Cited

U.S. PATENT DOCUMENTS

| | | | |
|---|---|---|---|
| 5,325,433 A | 6/1994 | Torii et al. | |
| 5,548,648 A | 8/1996 | Yorke-Smith | |
| 5,566,297 A | 10/1996 | Devarakonda et al. | |
| 5,583,940 A | 12/1996 | Vidrascu et al. | |
| 5,657,390 A | 8/1997 | Elgamal et al. | |
| 5,673,319 A | 9/1997 | Bellare et al. | |
| 5,754,651 A | 5/1998 | Blatter et al. | |
| 5,822,531 A | 10/1998 | Gorczyca et al. | |
| 5,974,144 A | 10/1999 | Brandman | |
| 5,991,810 A | 11/1999 | Shapiro et al. | |
| 5,996,086 A | 11/1999 | Delaney et al. | |
| 6,006,259 A | 12/1999 | Adelman et al. | |
| 6,018,805 A | 1/2000 | Ma et al. | |
| 6,029,245 A | 2/2000 | Scanlan | |
| 6,038,677 A | 3/2000 | Lawlor et al. | |
| 6,061,796 A | 5/2000 | Chen et al. | |
| 6,070,245 A | 5/2000 | Murphy, Jr. et al. | |

(Continued)

OTHER PUBLICATIONS

"BCM5820 E-Commerce Processor," BCM 5820 Product Brief, Broadcom, 2000, Irvine, California.

(Continued)

*Primary Examiner* — Krisna Lim

(74) *Attorney, Agent, or Firm* — Lewis and Roca LLP

(57) ABSTRACT

A network arrangement that employs a cache having copies distributed among a plurality of different locations. The cache stores state information for a session with any of the server devices so that it is accessible to at least one other server device. Using this arrangement, when a client device switches from a connection with a first server device to a connection with a second server device, the second server device can retrieve state information from the cache corresponding to the session between the client device and the first server device. The second server device can then use the retrieved state information to accept a session with the client device.

8 Claims, 6 Drawing Sheets

U.S. PATENT DOCUMENTS

| | | | |
|---|---|---|---|
| 6,078,957 | A | 6/2000 | Adelman et al. |
| 6,094,485 | A | 7/2000 | Weinstein et al. |
| 6,119,230 | A | 9/2000 | Carter |
| 6,125,186 | A | 9/2000 | Saito et al. |
| 6,125,366 | A | 9/2000 | Bernstein et al. |
| 6,141,423 | A | 10/2000 | Fischer |
| 6,145,089 | A | 11/2000 | Le et al. |
| 6,148,405 | A | 11/2000 | Liao et al. |
| 6,167,438 | A | 12/2000 | Yates et al. |
| 6,178,441 | B1 | 1/2001 | Elnozahy |
| 6,185,567 | B1 | 2/2001 | Ratnaraj et al. |
| 6,185,695 | B1 * | 2/2001 | Murphy et al. ............ 714/4.11 |
| 6,192,417 | B1 | 2/2001 | Block et al. |
| 6,195,366 | B1 | 2/2001 | Kayashima et al. |
| 6,199,110 | B1 | 3/2001 | Rizvi et al. |
| 6,263,437 | B1 | 7/2001 | Liao et al. |
| 6,275,588 | B1 | 8/2001 | Videcrantz |
| 6,288,739 | B1 | 9/2001 | Hales et al. |
| 6,317,729 | B1 | 11/2001 | Camp et al. |
| 6,317,831 | B1 | 11/2001 | King |
| 6,321,268 | B1 | 11/2001 | Dillon et al. |
| 6,333,983 | B1 | 12/2001 | Enichen et al. |
| 6,345,288 | B1 | 2/2002 | Reed et al. |
| 6,351,539 | B1 | 2/2002 | Djakovic |
| 6,385,596 | B1 | 5/2002 | Wiser et al. |
| 6,415,031 | B1 | 7/2002 | Colligan et al. |
| 6,453,343 | B1 | 9/2002 | Housel et al. |
| 6,490,610 | B1 | 12/2002 | Rizvi et al. |
| 6,502,135 | B1 | 12/2002 | Munger et al. |
| 6,505,192 | B1 | 1/2003 | Godwin et al. |
| 6,505,253 | B1 | 1/2003 | Chiu et al. |
| 6,519,636 | B2 | 2/2003 | Engel |
| 6,606,663 | B1 | 8/2003 | Liao et al. |
| 6,618,761 | B2 | 9/2003 | Munger et al. |
| 6,643,260 | B1 | 11/2003 | Kloth et al. |
| 6,728,747 | B1 | 4/2004 | Jenkins et al. |
| 6,754,832 | B1 | 6/2004 | Godwin et al. |
| 6,775,772 | B1 | 8/2004 | Binding et al. |
| 6,816,968 | B1 | 11/2004 | Walmsley |
| 6,829,720 | B2 | 12/2004 | Schoenthal et al. |
| 6,832,316 | B1 | 12/2004 | Sibert |
| 6,947,992 | B1 | 9/2005 | Shachor |
| 7,046,802 | B2 | 5/2006 | Rogaway |
| 7,058,723 | B2 | 6/2006 | Wilson |
| 7,062,570 | B2 | 6/2006 | Hong et al. |
| 7,177,424 | B1 | 2/2007 | Furuya et al. |
| 7,197,547 | B1 | 3/2007 | Miller et al. |
| 7,296,077 | B2 | 11/2007 | Harmon et al. |
| 7,304,951 | B2 | 12/2007 | Rhee |
| 7,346,925 | B2 | 3/2008 | Marejan |
| 7,353,380 | B2 | 4/2008 | VanHeyningen |
| 7,360,075 | B2 | 4/2008 | VanHeyningen |
| 7,383,329 | B2 | 6/2008 | Erickson |
| 7,526,533 | B1 | 4/2009 | Bue et al. |
| 7,631,084 | B2 | 12/2009 | Thomas et al. |
| 7,665,127 | B1 | 2/2010 | Rao et al. |
| 7,720,975 | B2 | 5/2010 | Erickson |
| 7,870,258 | B2 | 1/2011 | Sundaresan et al. |
| 7,870,380 | B2 | 1/2011 | VanHeyningen et al. |
| 7,954,144 | B1 | 5/2011 | Ebrahimi et al. |
| 8,032,642 | B2 | 10/2011 | Erickson |
| 2002/0023209 | A1 | 2/2002 | Domstedt et al. |
| 2002/0073167 | A1 | 6/2002 | Powell et al. |
| 2002/0083148 | A1 | 6/2002 | Shaw et al. |
| 2002/0094085 | A1 | 7/2002 | Roberts |
| 2002/0099829 | A1 | 7/2002 | Richards et al. |
| 2002/0112152 | A1 | 8/2002 | VanHeyningen et al. |
| 2002/0118836 | A1 | 8/2002 | Howard et al. |
| 2002/0138551 | A1 | 9/2002 | Erickson |
| 2003/0023845 | A1 | 1/2003 | VanHeyningen |
| 2003/0061372 | A1 | 3/2003 | Agarwalla et al. |
| 2003/0093511 | A1 | 5/2003 | Barde et al. |
| 2003/0167403 | A1 | 9/2003 | McCurley et al. |
| 2004/0107286 | A1 | 6/2004 | Larson et al. |
| 2005/0273849 | A1 | 12/2005 | Araujo et al. |
| 2006/0155857 | A1 | 7/2006 | Feenan et al. |
| 2007/0180125 | A1 | 8/2007 | Knowles et al. |
| 2008/0040550 | A1 | 2/2008 | Lindner |
| 2008/0104390 | A1 | 5/2008 | VanHeyningen et al. |
| 2008/0104686 | A1 | 5/2008 | Erickson |
| 2008/0141020 | A1 | 6/2008 | VanHeningen |
| 2010/0185728 | A1 | 7/2010 | Erickson |
| 2011/0173436 | A1 | 7/2011 | Vanheningen |

OTHER PUBLICATIONS

"MTP: Multicast Transport Protocol," an article posted on the Network and Telecommunications Research Group website address http://ntrg.cd.tcd.ie/4ba2/multicast/magnus/index.html on Jan. 24, 2001.

"Nokia VPN Gateways: Patented IP Clustering Technology Provides True Active Session Failover and Dynamic Load Balancing," Tech Note, Nokia Connecting People.

"TIB/Rendezvous Administration," Tibco Software Inc., Dec. 1999.

"TIB/Rendezvous C Reference," Tibco Software Inc., Dec. 1999.

"TIB/Rendezvous Concepts," Tibco Software Inc., Dec. 1999.

"TIB/Rendezvous Installation," Tibco Software Inc., Dec. 1999.

"TIB/Rendezvous Java Reference," Tibco Software Inc., Dec. 1999.

Armstrong, S. et al., "Multicast Transport Protocol," Network Working Group, Request for Comment: 1301, Feb. 1992.

Hamer, Johng "HasB.sml-Hashing Functions for Lab 2-B," Jun. 2000.

Information printed from website (www.broadcom.com/doc/promo5820.html) on Aug. 15, 2001, 6 pages.

Information printed from website (www.openssl.org/docs/apps/openssl.html) on Jul. 2, 2001, 7 pages.

Information printed from website (www.openssl.org/docs/crypto/crypto.html) on Jul. 2, 2001, 2 pages.

Information printed from website (www.openssl.org/docs/HOWTO/) on Jul. 2, 2001, 1 page.

Information printed from website (www.openssl.org/docs/ssl/ssl.html) on Jul. 2, 2001, 15 pages.

Leech, M. et al., Internet Engineering Task Force (IETF) Request for Comment (RFC) 1928, "SOCKS Protocol V5," Mar. 1996.

Leech, M. et al., Internet Engineering Task Force (IETF) Request for Comment (RFC) 1929, "Username/Password Authentication for SOCKS V5," Mar. 1996.

McGrew, David A. "Dacid Oran, Cisco Systems et al. The Secure Real Time Protocol." Nov. 2000. Cisco Systems IETF Standard-Working-Draft, Internet Engineering Task Force, CH XP015032291. ISSN: 000-0004.

Rescorla, E. "SSL and TLS, Designing and Building Secure Systems" Addison Wesley Publishing, pp. 43-55, 57-67, and 88-91, Oct. 2000.

Simon. D. "Microsoft Corporation, Microsoft Corporation's PCT Protocol," Document version 2.00, Apr. 1996, 38 pages.

Supplementary European Search Report in corresponding European Patent Office application, No. EP02714859, mailed Aug. 1, 2005.

The Authoritative Dictionary of IEEE Standard Terms, 2000 by IEEE, Inc., Seventh Edition, pp. 505-506.

Thomas, S. "SSL and TLS Essentials, Securing the Web" Wiley Publishing, Table of Contents pp. ix-xiii, pp. 10-11, p. 13, and pp. 118-129 (additional information from this book will be provided upon the Examiner's request), Feb. 2000.

Tung, B. "Kerberos A Network Authentication System" Addison Wesley Networking Basics Series, entire book pp. vii-164, May 1999.

U.S. Appl. No. 60/182,355, filed Feb. 14, 2000.

Uzgalis, Robert "Hasing Concepts and the Java Programming Language," Computer Science Departement, University of Auckland, Auckland, New Zealand, 1996.

Wireless Application Protocol, Wireless Transport Layer Security Specification, WAP WTLS WAP-199-WTLS, Version 18, Feb. 2000, 99 pages.

International Search Report for PCT/US02/03859 mailed May 30, 2002, 2 pages.

International Search Report for PCT/US02/03625 mailed Dec. 12, 2002, 1 page.

* cited by examiner

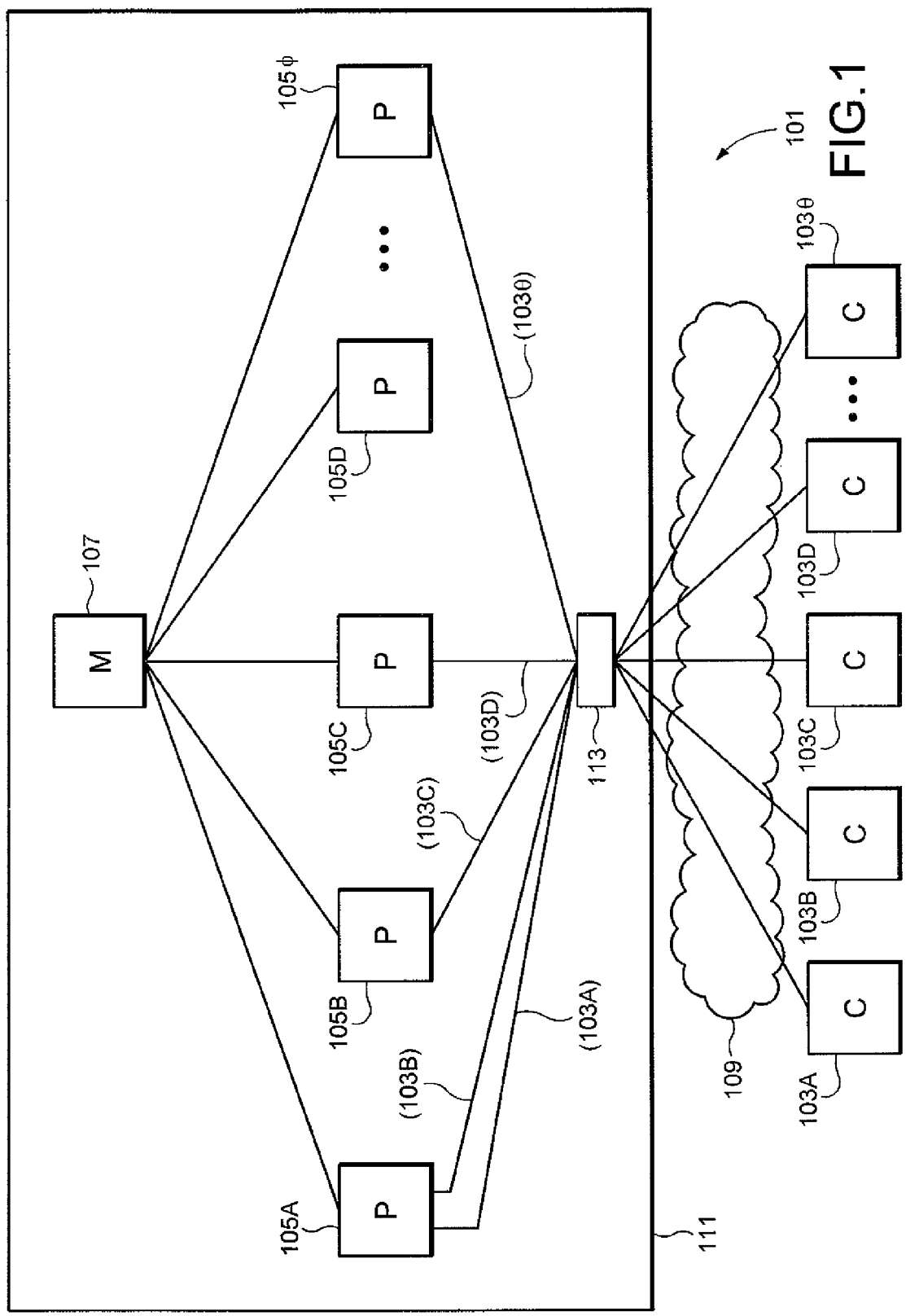

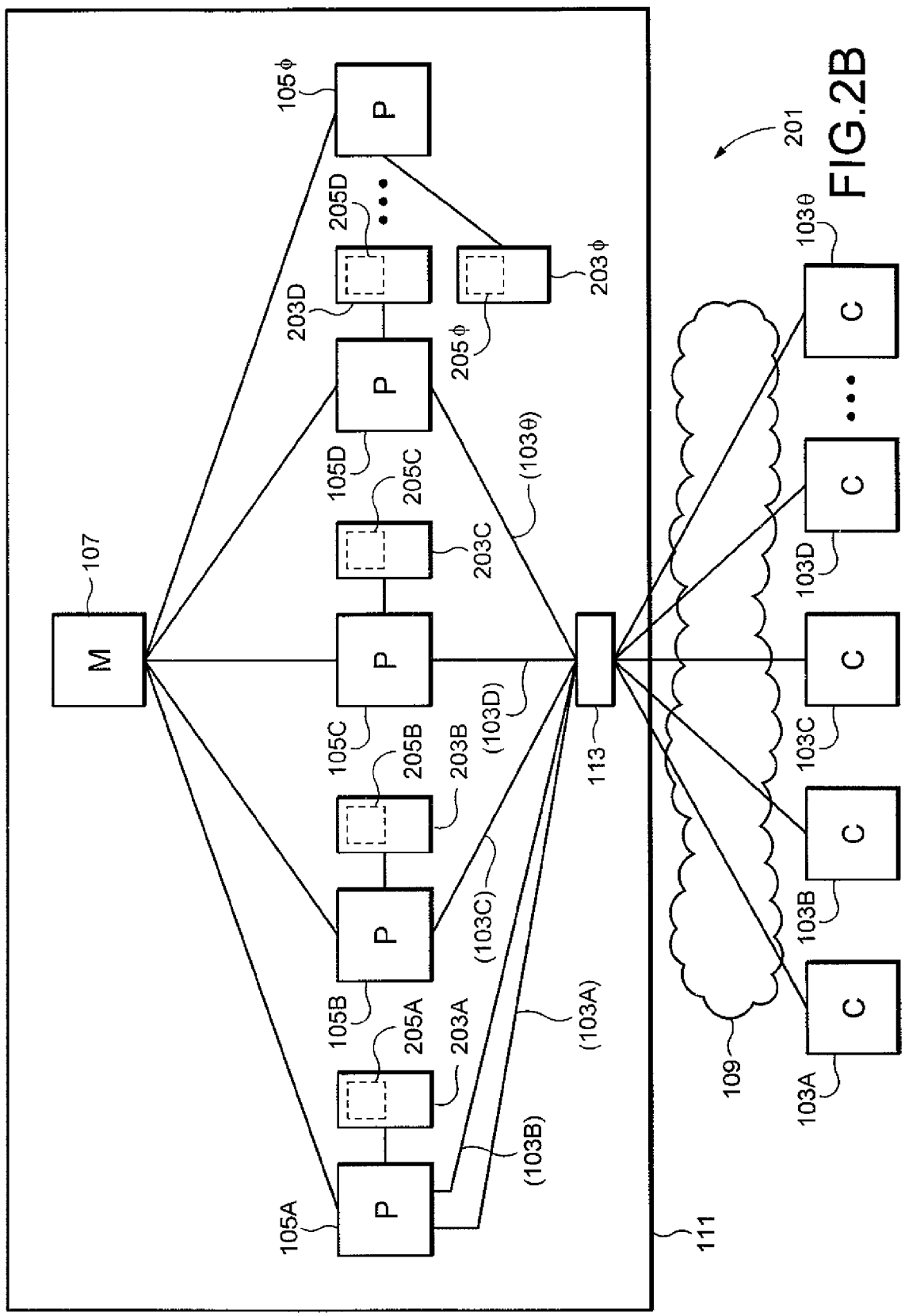

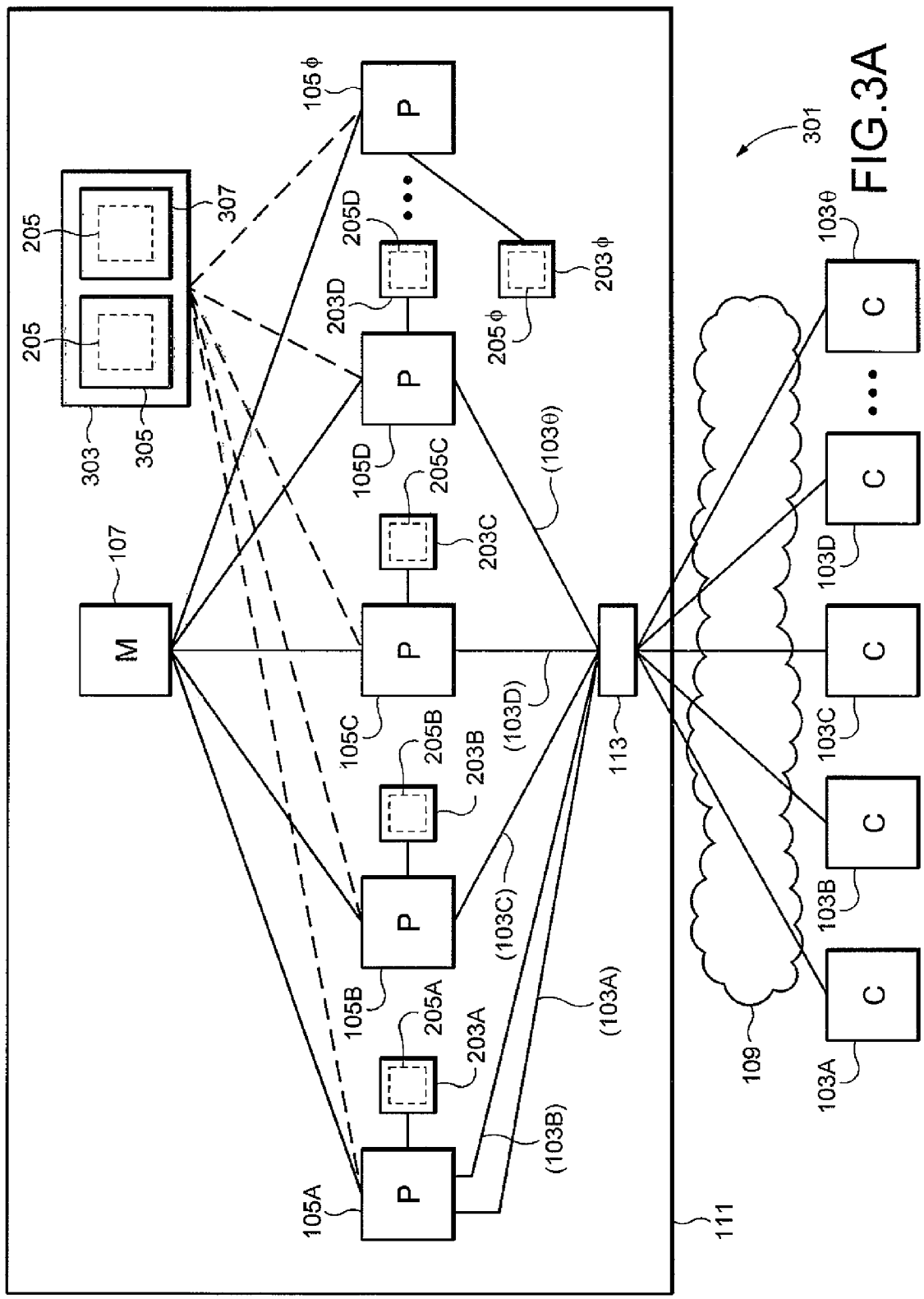

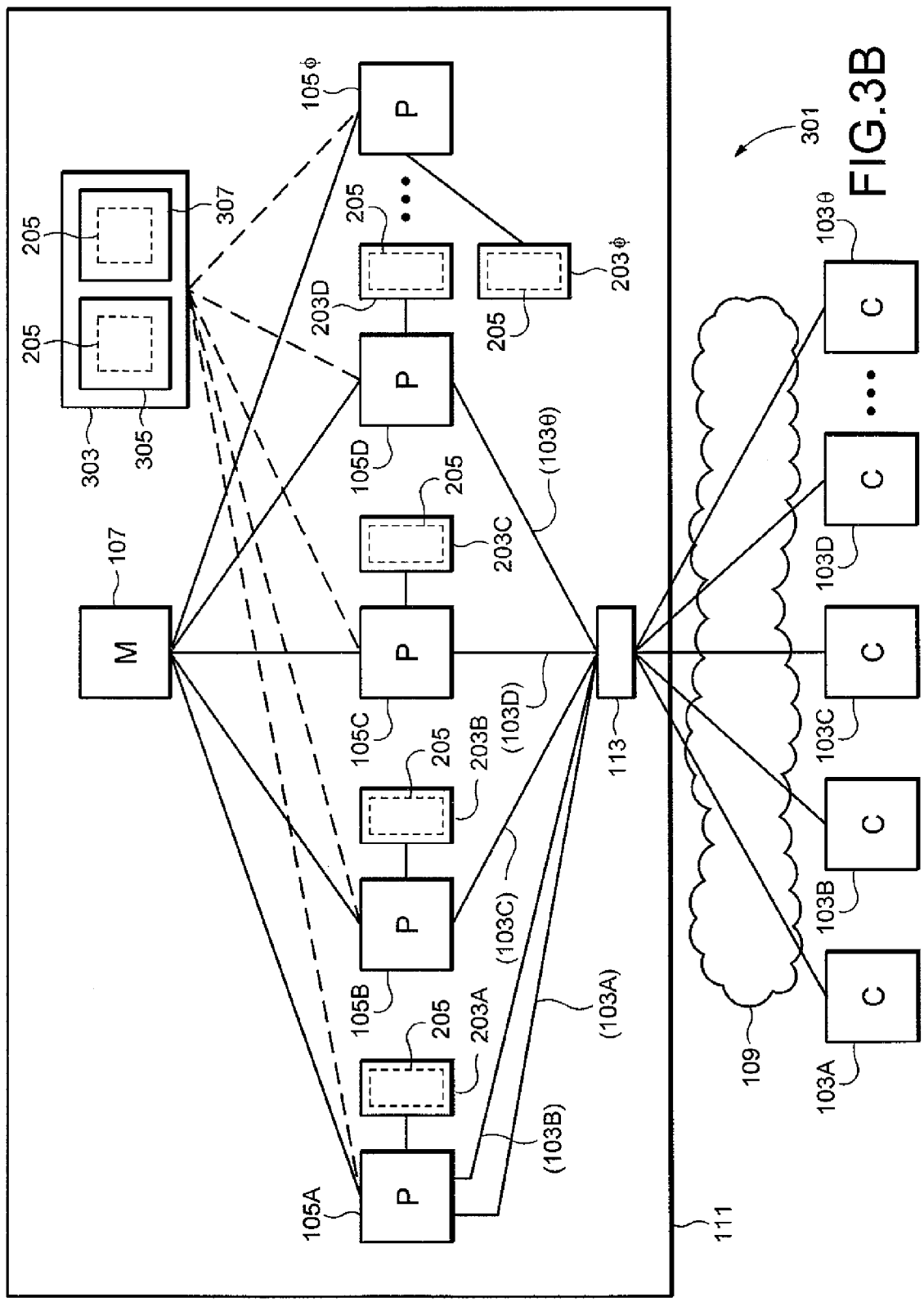

DISTRIBUTED CACHE FOR STATE TRANSFER OPERATIONS

CROSS-REFERENCE TO RELATED APPLICATIONS

This application is a continuation and claims the priority benefit of U.S. patent application Ser. No. 12/694,198 filed Jan. 26, 2010, now U.S. Pat. No. 8,032,642, which is a continuation of U.S. patent application Ser. No. 11/927,350 filed Oct. 29, 2007, now U.S. Pat. No. 7,720,975, which is a continuation of U.S. patent application Ser. No. 09/783,147 filed Feb. 13, 2001, now U.S. Pat. No. 7,383,329. The disclosure of each of the aforementioned applications is incorporated herein by reference.

This application is related to U.S. patent application Ser. No. 11/927,362 filed Oct. 29, 2007, now U.S. Pat. No. 7,870,380, which is a continuation of U.S. patent application Ser. No. 09/783,146 filed Feb. 13, 2001, now U.S. Pat. No. 7,360,075, which is a continuation-in-part of U.S. patent application Ser. No. 09/782,593 filed Feb. 12, 2001, now U.S. Pat. No. 7,353,380 and entitled, all of which are incorporated herein by reference for all purposes.

BACKGROUND OF THE INVENTION

1. Field of the Invention

The present invention relates to a distributed cache system for storing state transfer information. The cached state transfer information relates to the state of sessions between one or more client devices and at least one server device. For example, the state information may be credential information that has been exchanged between a client device and a server device to established secure communication between the two devices. According to the invention, the state information is cached at distributed locations accessible to a second server device. If the connection between a client device and the first server device is terminated, the second server device can then accept a connection from the client device using the cached state information.

2. Discussion of the Prior Art

Device networks have become ubiquitous in our modern society. Perhaps the most well known of these networks is the Internet, which may facilitate communication connections between thousands of individual devices, smaller proprietary and public device networks, and other devices. Typically, networks operate using a client-server relationship. With this relationship, one device, i.e., the "client" device, requests information from a "server" device that provides the requested information in response. The information may be of any type including, for example, pages written in the hypertext markup language (HTML) or other markup language, results of a particular calculation, or even raw digital data retrieved by the server device from a storage unit.

In order for the client device to request information from the server device and for the server device to provide the information to the client device in reply, the client device must establish a connection with the server device. A variety of protocols for these connections are known in the art. Two commonly used protocols, for example, are the transmission control protocol (TCP) and the Internet protocol (IP). As is known in the art, these protocols define the parameters used to exchange sets of data between the server device and the client device during a session. As is also known in the art, a session may have a particular state at any given time based upon the history of data exchanged between the client device and the server device.

For example, some device networks employ a security arrangement to ensure that unauthorized persons do not intercept or insert data exchanged between a client device and a server device. To establish a secure session, the client device may provide the server device with a password or other credential information that will authenticate the client device's identity to the server device. As is known in the art, credential information may include one or more of a public or private encryption key, a password, an authentication key, a digital signature, a digital certificate, a Kerberos ticket, or any other information used to encrypt data or authenticate the identity of a party. Also, the client and server device may exchange information in order to designate an encryption key for encrypting data to be exchanged between the client and server devices. Both the credential information and the designated encryption key are examples of state information for the session between the client device and the server device, as they both reflect a history of information previously exchanged between the two devices.

While the server-client device relationship offers many advantages to computer networks, one significant problem with this arrangement will now be described with reference to FIG. 1. This figure illustrates a typical computer network configuration 101. The network 101 includes a number of client devices 103A, 103B, 103C, 103D . . . 103θ, a plurality of proxy server devices 105A, 105B, 105C, 105D . . . 105φ, and at least one master server device 107. As will be understood by those of ordinary skill in the art, each of these devices can be implemented on a single computer or other computing unit employing a programmable processing device. Typically, a computer will have a microprocessor, a memory medium, and one or more input and output devices. Alternately, multiple client and/or server devices may be implemented on a single computer or other computing unit, or a single client or server device can be distributed among multiple computers or computing units.

As shown in the figure, each client device 103 communicates with a proxy server device 105 through a communication medium 109, such as the Internet or a direct-dialed telephone connection. For example, the client device 103A communicates with the proxy server device 105A. Each proxy server device 105 then communicates with the master server device 107. Thus, the proxy server device 105A can relay messages between the client devices 103A and the master server device 107. The network 101 also includes a firewall 111 for limiting access to the proxy server devices 105A, 105B, 105C, 105D . . . 105φ, and a load balancer 113 for distributing connections from the client devices 103A, 103B, 103C, 103D . . . 103θ evenly among the proxy server devices 105A, 105B, 105C, 105D . . . 105φ. It should be noted that, while FIG. 1 illustrates only a single master server device 107 for convenience of understanding, the proxy server devices 105A, 105B, 105C, 105D . . . 105φ might normally communicate with a plurality of master server devices 107 simultaneously.

In this example, the client devices 103A, 103B, 103C, 103D . . . 103θ communicate with the master server device 107 through the proxy server device 105A, 105B, 105C, 105D . . . 105φ. This arrangement is commonly used where, e.g., the proxy server devices 105A, 105B, 105C, 105D . . . 105φ perform a function for the master server device 107 in order to conserve the resources of the master server device 107. For example, if identity of a client device 103 must be authenticated before the master server device 107 can respond to a request for information, the proxy servers 105A, 105B, 105C, 105D . . . 105φ may be used to authenticate the client devices 103A, 103B, 103C, 103D . . . 103θ before passing a request for information to the master server 107. This frees the master server 107 from the responsibility of authenticating the identity of each client device 103, and allows the master server 107 to dedicate its resources (e.g., its microprocessor operations) to providing requested information.

The proxy server devices 105A, 105B, 105C, 105D . . . 105φ may also be used to provide secure communication between the master server device 107 and the client device 103. With this arrangement, for example, the client device 103 and the server device 105A may designate an encryption key to encrypt messages exchanged between the two devices. Once a secure session is established between the client device 103A and the server device 105A, the proxy server device 105A can simply decrypt information from the client device 103A and relay it to the master server device 107. The proxy server device 105A can also encrypt information from the master server device 107 and relay it to the client device 103A. As will be appreciated by those of ordinary skill in the art, this arrangement shifts the overhead of providing secure communication from the master server 107 to the proxy server devices 105A, 105B, 105C, 105D . . . 105φ, thereby allowing the master server device 107 to more quickly respond to requests from the client devices.

A problem with this arrangement occurs, however, if the connection between a client device 103 (e.g., the client device 103A) and its associated proxy server device 103 (e.g., the proxy server device 105A) is terminated. The client device 103A may then try to reestablish communication with the master server device 107 through another proxy server device 105, e.g., proxy server device 105B. For example, the first proxy server device 105A may have failed and be unavailable, or the load balancer 113 may simply have routed the new connection from the client device 103A to the proxy server device 105B to reduce the communication load on the first proxy server device 103A. In any case, the new proxy server device 105B will not have the authentication information authenticating the identity of the client device 103A. Also, the new proxy server device 103B will not have the encryption key established with the previous proxy server device 105A. Accordingly, the state of the session between the client device 103 and the original proxy server device 105A is lost, and the client device 103 must reestablish its authentication information and an encryption key with the new proxy server device 105B.

This process is time-consuming, and may require a substantial amount processing time from the new proxy server device 105B. Moreover, depending upon the state of the original session between the client device 103 and the proxy server device 105A, the loss of the previous session's state may be irreplaceable. For example, if the state of the earlier session was established by exchanging data that cannot be duplicated, then the state of that session cannot be recreated.

To address this problem, some network systems attempt to ensure that a terminated connection between a client device 103 and its associated proxy server device 105 is reestablished with that original proxy server device 105 rather than with a new proxy server device 105. For example, some systems design the load balancer 113 to recognize when the client device 103A has established a session with the proxy server device 105A, and then routing all future connections from client device 103A to the proxy server device 105A. This solution has a number of drawbacks, however. It requires that the load balancer 113 be very complex and perform a variety of functions. Further, it does not address the situation that occurs if the initial proxy server device 105A becomes unavailable, e.g., if it fails and cannot reestablish a connection with the client device 103. It also does not address the situation where the first proxy server device 105A becomes overloaded with connections to other client devices 103. In effect, this solution may prevent the load balancer 113 from performing a load balancing function.

SUMMARY OF THE INVENTION

Accordingly, there is a need for a network arrangement that will allow a client device to switch between a communication connection with a first server device to a second server device while maintaining the state of the session established between the client device and the first server device. Moreover, there is a need for a network arrangement that permits such a switch from a connection with a first server to a connection with a second server even if the first server becomes unavailable due to failure or other problems.

Advantageously, the invention provides a network arrangement that employs a cache having copies distributed among a plurality of different locations. According to the invention, state information for a session with any of the server devices is stored in the cache so that it is accessible to at least one other server device. Using this arrangement, when a client device switches from a connection with a first server device to a connection with a second server device, the second server device can retrieve state information from the cache corresponding to the session between the client device and the first server device. The second server device can then use the retrieved state information to accept a session with the client device having a similar or identical state. According to some embodiments of the invention, identical copies of the cache are stored for each server device in the network arrangement, and each server device accesses its own copy of the cache to obtain necessary state information. With other embodiments of the invention, a copy of the cache is maintained at a single source (e.g., a redundant set of cache storage devices) that is accessible to all of the server devices in the network arrangement. Each server device then maintains a copy of only a portion of the entire cache for its local use.

BRIEF DESCRIPTION OF THE DRAWINGS

FIG. 1 illustrates a conventional network arrangement employing a client device, a plurality of proxy server devices, and a master server device.

FIGS. 2A and 2B illustrate two networks according to one embodiment of the invention.

FIGS. 3A and 3B illustrate two networks according to another embodiment of the invention.

DETAILED DESCRIPTION

According to various embodiments of the invention, server devices in a network store state information reflecting the state of sessions with client devices. In particular, each server device stores its state information in a cache so that it is accessible to at least one other server device in the network. Thus, if the connection for a session between a client device and a server device is terminated, the client device can establish a new session with another server device using the state information for the previous session that was stored in the cache. For example, if a first server device and a client device have designated an encryption key for exchanging encrypted messages, the first server device can store the encryption key in the cache. If the connection between the client device and the first server device is then terminated, and the client device seeks to establish a new connection to a second server device, the second server device can retrieve the encryption key from the cache in order to maintain secure communications with the client device. The new proxy server device thus will not need to exchange data with the client server device to determine a new encryption key.

Because the state information in the cache must be accessible to multiple server devices in the network, the cache should be stored so that each of the server devices in the network can efficiently retrieve state information from the cache. Further, if the copies of the cache (or copies of portions of the cache) are physically distributed among different locations, each server device in the network should be able to efficiently communicate with each copy of the cache, i.e., to efficiently update each copy of the cache with new or updated state information, or to retrieve stored state information from more than one copy of the cache. Accordingly, the storage arrangements and communication techniques employed by various embodiments of the invention will be discussed in detail below.

Figure 2A:
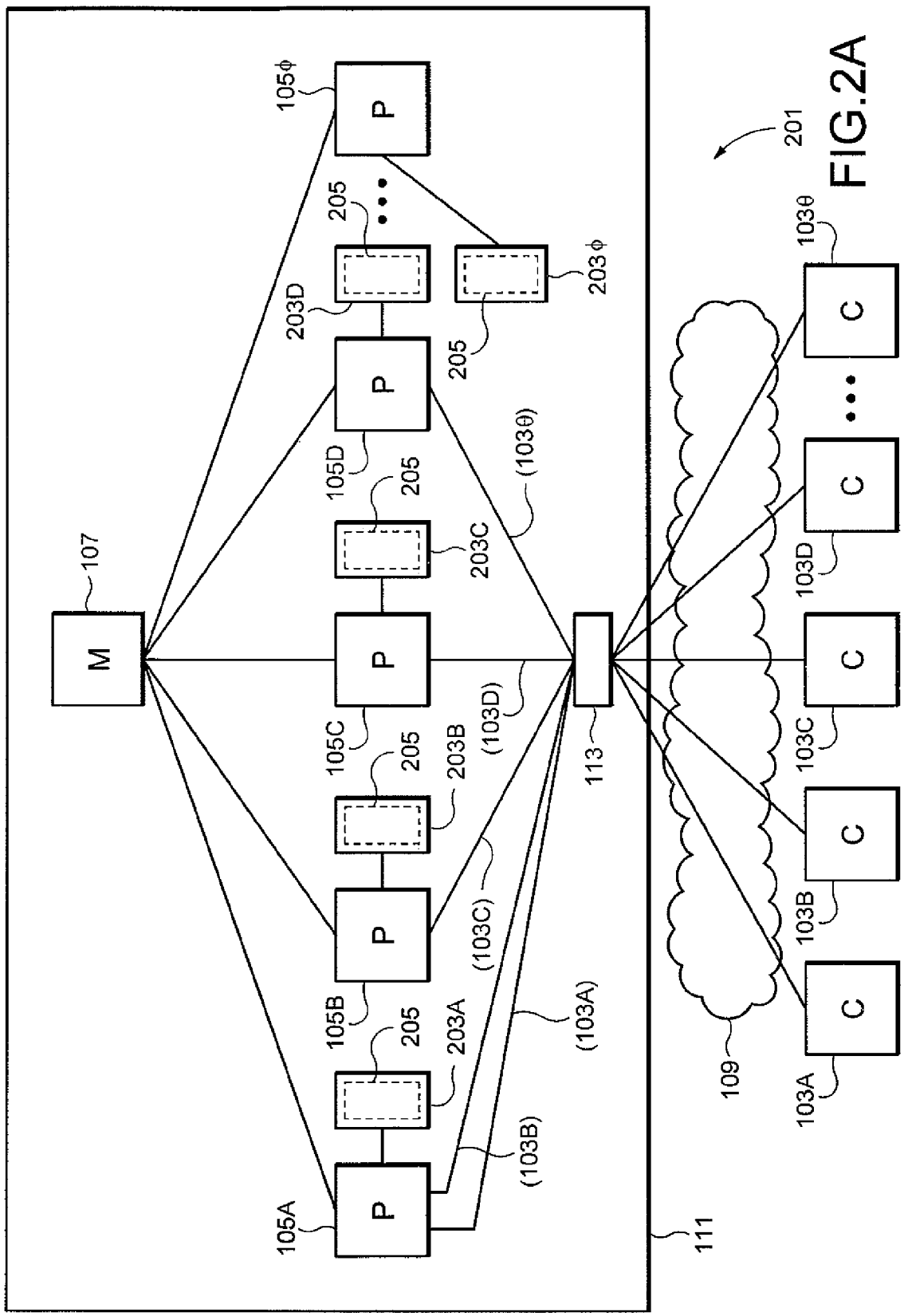

One network arrangement 201 including a first embodiment of the invention is illustrated in FIG. 2A. As with the network 101 described above with reference to FIG. 1, the network 201 shown in FIG. 2A includes a number of client devices 103A, 103B, 103C, 103D . . . 103θ and a plurality of proxy server devices 105A, 105B, 105C, 105D . . . 105φ, each of which is connected to a master server device 107. Also, a connection from each client device 103 is carried through a communication medium 109 to a load balancer 113, which then routes communications from each client device 103 to one of the proxy server devices 105A, 105B, 105C, 105D . . . 105φ for relay to the master server device 107. As previously noted any of the server and client devices can be implemented on a single computing unit or distributed across multiple computing units. Also, multiple client and/or server devices may be implemented on a single computing unit.

While only the single master server device 107 is shown in FIG. 2A for ease of understanding, the network 201 can include a number of master client server devices 107, each communicating with a number of proxy server devices 105 simultaneously. The number of client devices 103 communicating with each proxy server 105 in the network 201 could be, for example, more than 100. Similarly, the network could include a large number (e.g., in excess of 100) of server devices 105A, 105B, 105C, 105D . . . 105φ communicating with each master server device 107. The communication medium 109 may be any suitable medium. For example, if the client server device 103A is configured to communicate with the proxy server 105A using a Web-based communication program (e.g., a browser), then the communication medium 109 may be the Internet. Alternately, if the client server device 103D is configured to communicate with the proxy server 105B using a remote dial-up communication program, then the communication medium 109 may be a direct plain old telephone system (POTS) connection.

Unlike the network arrangement 101 shown in FIG. 1, each of the proxy server devices 105A, 105B, 105C, 105D . . . 105φ in the network 201 includes a cache memory 203. According to the invention, each of the cache memories 203A, 203B, 203C, 203D . . . 203φ contains a copy of a cache 205. As will be explained in detail below, the cache 205 contains a collection of state information based upon the states of various sessions between the multiple client devices 103A, 103B, 103C, 103D . . . 103θ and the multiple proxy server devices 105A, 105B, 105C, 105D . . . 105φ. For example, the cache 205 contains state information corresponding to the state of the session between the client device 103A and the proxy server device 105A. Thus, if the connection between the client device 103 and the proxy server device 105A is terminated, the client device 103A can establish a new session with any of the other proxy server devices 105B, 105C, 105D . . . 105φ that has the same state as the earlier session between the client device 103A and the proxy server device 105A.

In one embodiment of the invention, each cache memory 203A, 203B, 203C, 203D . . . 203φ contains a complete copy of the cache 205. As each proxy server device 105 obtains new state information for a new session with a client device 103, or updated state information for an existing session with a client device 103, the proxy server device 105 sends the new or updated state information to each copy of the cache 205 for storage.

The network 201 embodying the invention provides significant advantages over the conventional network arrangement 101 shown in FIG. 1. Because a client device 103 can establish a session with any of the proxy server devices 105 using the state information obtained during a previous session, the load balancer 113 does not need to try to route a connection from a client device 103 back to the proxy server device 105 with which it had previously established a session. Thus, the function of the load balancer 113 can be simplified to distributing incoming communications from client devices 103A, 103B, 103C, 103D . . . 103θ evenly among the available proxy servers 105A, 105B, 105C, 105D . . . 105φ. Further, even if a proxy server device 105 becomes completely unavailable (i.e., it suffers a complete failure), the client device 103 can establish a new session with another proxy server device 105 without having to recreate the state information previously obtained in the earlier session.

While the above-described embodiment maintains a complete copy of the cache 205 in each cache memory 203, other embodiments of the invention may keep a copy of only a portion of the cache 205 in each cache memory 203 as shown in FIG. 2B. With these embodiments, however, the state information for each session should still be stored in the multiple cache memories 203A, 203B, 203C, 203D . . . 203φ so that each proxy server device 105 can access the state information. For example, the state information for the session between the client 103A and the proxy server device 105A may be stored in only the cache memory 203A (associated with proxy server device 103A), cache memory 203B (associated with proxy server device 103B), and cache memory 203C (associated with proxy server device 103C). If the proxy server device 105A then becomes unavailable and the client device 103A is switched to a connection with the proxy server device 105B, then the proxy server device 105B can establish a session with the client device 103A using the state information retrieved from its own memory cache 105B.

Moreover, even if the client device 103A is instead switched to a connection with a proxy server device that does not have the state information in its cache memory (e.g., proxy server device 105D), then that proxy server device can request the state information from another, available proxy server device 105 (e.g., proxy server device 105B) that does have the appropriate state information in its cache memory 203. For example, if the connection with the client device 103A is switched to proxy server device 105D, that proxy server device 105D can sequentially request the state information from the other available proxy server devices 105 until it receives the state information in reply. Alternately, the proxy server device 105D may issue simultaneous requests to all of the other available proxy server devices 105, and employ, e.g., the state information in the first received reply.

The above-described embodiments of the invention may be referred to as peer configurations type embodiments, as the proxy server devices 105 alone are responsible for maintaining the cache 205. With these peer configuration embodiments of the invention maintaining copies of the entire cache 205 (or copies of overlapping portions of the cache 205) in each cache memory 203A, 203B, 203C, 203D . . . 203φ requires that each proxy server device 105 transmit new or updated state information to multiple cache memories 203 in a write process. Preferably, this write process is performed using a reliable communication technique that requires a positive acknowledgement from the receiving device, so that each proxy server device 105 can confirm that its associated cache memory 203 has processed the new or updated state information. If the number of proxy server devices 105 in the network is relatively small, the type and amount of state information being saved by the proxy server devices 105 is relatively stable, and the total amount of state information in the cache 205 is relatively small, then writing the necessary state information to each cache memory 203A, 203B, 203C, 203D . . . 203φ with this configuration using a reliable, positive-acknowledgement based communication technique will not create a large resource overhead for the network 201.

For example, if the type of state information being stored in the cache 205 is simply credential information authenticating the client devices, or encryption keys for encrypting communications with the client devices, then the number of write operations performed by the proxy server devices 105A, 105B, 105C, 105D . . . 105φ to the cache memories 203A, 203B, 203C, 203D . . . 203φ may be small. Typically, a client device will authenticate itself or establish an encryption key only once during a designated time period. Once this state information has been established with a proxy server device 105 and written to two or more of the cache memories 203A, 203B, 203C, 203D . . . 203φ, it will probably not be updated for the remainder of the designated time period. Similarly, if the network 201 only has nine proxy server devices 105, then writing new or updated state information to each proxy server device 105 does not consume an inordinate amount of the network's resources.

If, on the other hand, the type of state information stored in the cache 205 must be updated frequently, or the network includes a large number of TCP proxy server devices 105 (e.g., more than nine proxy server devices), then writing each piece of new or updated state information to every proxy server device 105 in the network may divert significant resources from the network 201. For example, if the state information is TCP/IP header data for data packets transmitted during a session with the client device 103, the cache 205 must be updated each time the proxy server device 105A receives a data packet. Also, as the number of client devices 103 increases, even infrequent updates to multiple cache memories 203 for each client device 103 using a reliable, positive-acknowledgement communication technique may divert a significant amount of resources from the network 201. Similarly, as the number of proxy server devices 105 increases, writing new or updated state information to the cache memory of each proxy server device 105 using a reliable, positive-acknowledgement communication technique may divert a significant amount of resources from the network 201. Further, if the cache 205 becomes too large, it may be difficult to store a complete copy of the cache in the cache memory 203 of a proxy server device 105.

Accordingly, a network 301 implementing yet another embodiment of the invention is shown in FIG. 3A. As with the previously discussed network arrangements 101 and 201, the network 301 includes a plurality of client devices 103A, 103B, 103C, 103D . . . 103θ and a plurality of proxy server devices 105A, 105B, 105C, 105D . . . 105φ, each of which are connected to the master server device 107. As also previously described, each client device 103 is connected to a load balancer 113 through a communication medium 109 and a firewall 111. The load balancer 113 routes a connection from each client device 103 to one of the proxy server devices 105 (e.g., from client device 103A to proxy server device 105A as shown in the figure). Also, as with the network 201 shown in FIG. 2, each of the proxy server devices 105A, 105B, 105C, 105D . . . 105φ in the network 301 has an associated cache memory 203A, 203B, 203C, 203D . . . 203φ.

This embodiment of the invention additionally includes, however, a cache repository 303, for storing one or more copies of the cache 205. As will be understood from the following explanation, this embodiment is thus a two-tiered configuration for storing the cache 205, rather than a peer configuration as with the previously discussed embodiments of the invention. That is, this embodiment has one tier of state information storage provided by the cache memories 203A, 203B, 203C, 203D . . . 203φ of the proxy server devices 105A, 105B, 105C, 105D . . . 105φ, and a second tier of state information storage provided by the cache repository 303.

As seen in FIG. 3A, the cache repository 303 may include two cache memory server devices 305 and 307. Each of these cache memory server devices 305 and 307 stores a complete copy of the cache 205. It should be noted, however, that the cache repository 303 includes the two cache memory server devices 305 and 307 for redundancy. Thus, if one of the cache memory server devices 305 and 307 fails or otherwise becomes unavailable, the cache repository 303 will still include a complete copy of the cache 205 in the remaining cache memory server device. Other embodiments of the invention may alternately employ only a single cache memory server device as the repository 303 if redundancy is not desired, or three or more cache memory server devices if redundancy is a priority.

The cache memories 203A, 203B, 203C, 203D . . . 203φ in the embodiment of FIG. 3A might not store copies of the entire cache 205. Instead, if the cache 205 is larger than can be stored in the cache memories 203A, 203B, 203C, 203D . . . 203φ, each cache memory 203 may store only a portion of the cache 205 that relates to its associated proxy server device 105. For example, the portion of the cache 205 copied into cache memory 203A may only include the state information for sessions established with the proxy server devices 103A and 103B. Thus, if the client device 103A loses its connection to the proxy server device 105A, and then tries to establish a new session with the proxy server device 105B, the cache memory 203B may not contain state information for the earlier session with the proxy server device 105A.

With this embodiment, however, when a proxy server 105 receives a request to establish a session with a client device 103 for which it's memory cache 203 does not have state information, the proxy server device 105 can obtain the relevant state information from the cache repository 303. Thus, in the foregoing example, the proxy server device 105B will obtain the state information for the client device's 103A previous session from the cache repository 303. The new proxy server device 105 can then use the state information to establish a new session with the same or a similar state as the previous session.

In addition to being useful where the size of the cache 205 is too large for an entire copy of the cache 205 to efficiently be stored in the cache memory 203 of a proxy server device 105, this embodiment of the invention employing a cache repository 303 will typically also be more efficient for networks with very large numbers of proxy server devices 105A, 105B, 105C, 105D . . . 105φ (e.g., networks with more than ten proxy server devices, depending upon whether the type of state information being stored in the cache 205 requires the cache 205 to be updated frequently). With this embodiment, each proxy server device 105 will normally need to use a reliable, positive-acknowledgement communication technique to write new or updated state information to only the cache repository 303, thereby reducing the amount of communication traffic (created by write operations and their confirmations) across the network. The other proxy server devices 105 in the network can then obtain the new or updated state information through less reliable communication techniques, or directly from the cache repository 303, as will be discussed below.

It should be noted, however, that the two-tiered arrangement shown in FIG. 3A is exemplary. Those of ordinary skill in the art will appreciate that three-tier, four-tier and other multiple tier arrangements can be employed, depending upon the total size of the cache 205. For example, if the size of the cache is too large to be efficiently stored in a single cache memory server device 305 or 307, then two or more cache repositories 303 can be employed, each storing a different portion of the cache 205. An entire copy of the cache 205 may then be stored on a relatively inefficient storage device (e.g., a bank of magnetic disk storage devices) accessible to each of the cache repositories 303. Also, each proxy server device 105 may then be associated with a particular cache repository 303, and store some or the entire portion of the cache 205 maintained by its associated cache repository 303. Various other embodiments will be apparent to those of ordinary skill in the art. Accordingly, the term "multi-tiered" will be used hereafter to refer to embodiments of the invention having two or more hierarchical levels of devices storing at least a portion of the cache 205.

It also should be noted that, with alternate embodiments of invention, the different portions of the cache 205A, 205B, 205C, 205D . . . 205φ stored in cache memories 203A, 203B, 203C, 203D . . . 203φ may overlap. For example, the portion of the cache 203A may contain state information that is also stored in the portion of the cache 203B and the portion of the cache 203C. Having some overlap between the different portions of the cache 205 may reduce the amount of network traffic, as a proxy server device 105 may already have state information for a new client device 103 seeking connection. Further, each of the cache memories 203A, 203B, 203C, 203D . . . 203φ may contain a copy of the entire cache 205, as shown in FIG. 3B. This embodiment of the invention may be preferable to the embodiment shown in FIG. 3A, when, e.g., the size of the cache 205 is sufficiently small to be stored in its entirety in a cache memory 203.

Figure 4:
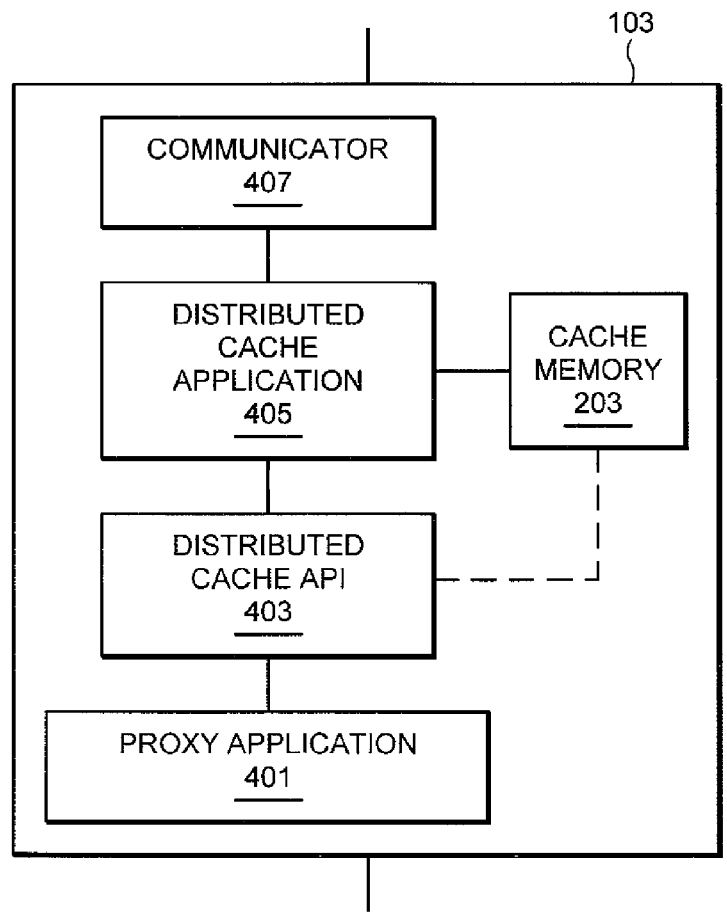
FIG. 4 illustrates a proxy server device according to one embodiment of the invention.

One possible embodiment of a proxy server device 105 will now be described with reference to FIG. 4. As seen in this figure, the proxy server device 105 includes a proxy application 401, a distributed cache application programming interface (API) 403, a distributed cache application 405, a communicator application 407, and the cache memory 203. As will be discussed in detail below, the proxy application 401 performs the primary functions of the proxy server device 105. For example, in the illustrated embodiment, the proxy application 401 establishes secure communication with a client device 103, and relays messages between the client device 103 and the master server 107. The proxy application 401 also sends state information for a session with a client device 103 to the distributed cache application 405 via the distributed cache API 403.

The distributed cache API 403 retrieves information from the cache memory 203, and facilitates requests to send information to or delete information from the cache memory 203 by passing them along to the distributed cache application 405. The distributed cache application 405 stores information in the cache memory 203, and also controls the exchange of information between the cache memory 203 other proxy server devices 105 (and, where applicable, the cache repository 303). The distributed cache application 405 communicates with the other proxy server devices 105 (and the cache repository 303, where applicable) through the communicator application 407.

The proxy application 401 may be any application that establishes a session with a client device 103. In this particular embodiment, the proxy application 401 operates to establish a secure session with a client device 103, and relay messages from that secure session to the master server device 107. For example, in some preferred embodiments of the invention, the proxy application 401 may employ the Secure Socket Layers (SSL) protocol to establish a secure session with a client device 103. The SSL protocol is well-known in the art. It should be noted that, after undergoing various revisions, SSL was renamed the Transport Layer Security (TLS) protocol, and adopted by the Internet Engineering Task Force (IETF), as reflected in RFC 2246. Therefore, it will be appreciated that the term SSL, as used hereafter, is intended to include both the SSL and TLS protocols.

According to the SSL protocol the client device 103 initiates a session by completing a full SSL "handshake" with the proxy application 401. During this handshake, the client device 103 and the proxy application 401 exchange SSL version numbers, cipher settings, session-specific data, authentication certificates, and other information that they need to communicate with each other using the SSL protocol. Using this information, both the client device 103 and the proxy application 401 generate the same master secret key, which in turn is used to generate individual session keys. These session keys are symmetric keys used to encrypt and decrypt individual groups of information exchanged during the session, and to verify the integrity of exchanged information.

As will be appreciated by those of ordinary skill in the art, conducting a full SSL handshake to initiate a SSL session is time consuming and presents a heavy load on the network's resources, both in terms of network communication traffic and in processing time for the client device 103 and the proxy application 401. Once the proxy application 401 has received the required SSL session information in a full SSL handshake, however, the proxy application 401 may subsequently resume that SSL session with the client device 103 using only a partial SSL handshake. Advantageously, the partial SSL handshake is much quicker and consumes less network resources than the full SSL handshake.

Accordingly, after completing the full SSL handshake, the proxy application 401 sends SSL session information obtained from the full SSL handshake to the cache memory 203 for storage. As is known in the art, the SSL information can include a session identifier (e.g., an arbitrary byte sequence chosen by the proxy application 401 to identify an active or resumable session state) and a peer certificate. The SSL information may also include a cipher specification, specifying the bulk data encryption algorithm (such as null, DES, etc.), the message authentication check (MAC) algorithm (such as MD5 or SHA), and the cryptographic attributes (such as the hash size) used by the client device 103 and the proxy application 401. Still further, the SSL information may include the algorithm used to compress data prior to encryption, the master secret key, and flag information indicating whether or not the session can be used to initiate new connections.

More particularly, the proxy application 401 may form a record for storage in the cache 205 that includes a data field with the SSL resumption information and a key field with the SSL session identifier. The record may also include a time-to-live field with a time at which the record will expire and should be removed from the cache. In addition, the record may include a record identifier pre-pended to the key information (i.e., the session identifier), as will be discussed below. The proxy application 401 passes this record through the distributed cache API 403 to the distributed cache application 405 for storage in the cache memory 203.

When the proxy application 401 receives a request from a client device 103 to initiate a session, the request will include a SSL session identifier if that client device 103 has already established an SSL communication with a proxy application 401 (either the same proxy application 401 now receiving the request or another proxy application 401). The proxy application 401 then passes the SSL session identifier onto the cache API 403 as a search key, so that the API 403 may request the distributed cache application 405 to retrieve the SSL information from the cache memory 203 corresponding to the SSL session identifier.

As previously noted, the function of the distributed cache API 403 is to retrieve an existing record from the cache memory 203 using a GET operation. Further, the some embodiments of the invention, the distributed cache API 403 facilitates requests to add, delete or modify a record by passing these commands onto the distributed cache application 405. Thus, the distributed cache application 405 may perform ADD, DELETE and UPDATE operations on the cache memory 203. Preferably, the ADD operation adds a record to the cache memory 203 based upon the information in the record's key field, even if the record for that key already exists in the cache memory 203. The DELETE operation removes a record from the cache memory 203, while the UPDATE operation updates a record already existing in the cache memory 203. Also, the distributed cache application 405 may have the capability forcing a purge of each of the cache memories 203A, 203B, 203C, 203D . . . 203ϕ.

It should be noted that the cache API 403 will first attempt to complete a GET operation by obtaining the requested record from the local copy of the cache 205 (or the copy of the portion of the cache 205) from the cache memory 203. With some preferred embodiments of the invention, this request will be immediately successful, as each cache memory 203 stores a complete copy of the cache 205. If the requested record is not found in the local cache memory 203, (e.g., if the cache memory 203 contains only a portion of the cache 205 that does not have the requested record or a copy of the cache 205 that has been corrupted), however, then the cache API 403 will involve the distributed cache application 405 to obtain the record from another source. With the peer configured embodiment of the invention shown in FIGS. 2A and 2B, the distributed cache application 405 will attempt to retrieve the requested record from one or more of the other proxy server devices 105. In the multi-tier configured embodiment of the invention shown in FIGS. 3A and 3B, however, the distributed cache application 405 may instead attempt to retrieve the requested record from the cache repository 303.

Similarly, when the distributed cache application 405 adds, updates, or deletes a record from its local cache 203, it also relays the corresponding add, update or delete command to other devices in the network. For example, in the peer configured embodiment of the invention shown in FIGS. 2A and 2B, the distributed cache application 405 will relay the command to each of the other proxy server devices 105. In the multi-tier configured embodiment of the invention shown in FIGS. 3A and 3B, however, the distributed cache application 405 may relay the command to the cache repository 303. The cache repository 303 may then in turn relay the command to one or more of the other proxy server devices 105. In this manner, new or updated state information obtained by the proxy application 401 of one proxy server device 105 is conveyed to the other proxy server devices 105 for use in future sessions with the client device 103.

The storage of the state information in the cache 205 by the distributed cache application 405 will now be discussed. As will be appreciated by those of ordinary skill in the art, as the number of proxy server devices 105A, 105B, 105C, 105D . . . 105ϕ increases, the number of possible sessions between client devices and proxy server devices 105A, 105B, 105C, 105D . . . 105ϕ also increases. Accordingly, the amount of state information stored in the cache will increase as well. This is true for both the peer distributed cache embodiment exemplified in FIGS. 2A and 2B and for the multi-tiered distributed cache embodiment exemplified in FIGS. 3A and 3B. Accordingly, state information should be stored in the cache 205 so that it can be quickly and efficiently retrieved when necessary. Some preferred embodiments of the invention may therefore use a hash table to implement the cache 205, and employ a hashing function to store and retrieve state information from the hash table.

As is known in the art and discussed above, each piece of state information may be stored in the cache 205 as part of a record. To enter a record into a hash table, the distributed cache application 405 performs a mathematical algorithm or "hash" operation on the key data in the key field (e.g., the SSL session identifier) in order to map the key data to a numerical value. The state information identified by the key data is then stored in the hash table at a location (sometimes referred to as a "bucket") corresponding to the numerical value against which the key data was mapped by the hash operation.

It should be noted that different key values may hash to the same hash value. Thus, different records may be stored in the same location in or bucket in the hash value. Accordingly, the hash operation preferably is selected so that an even distribution of hash values is obtained for the entire range of possible key data values. This is to ensure that a disproportionate number of records are not stored at a particular location in the hash table. That is, it is preferable to employ a hash operation that evenly distributes records in the hash table. Thus, when a record must be retrieved, the average retrieval time for a record from any location in the hash table should be close to or the same as from any other location in the hash table.

According to some preferred embodiments of the invention, the "BUZhash" hashing algorithm may be employed to evenly distribute state information records in the cache 205. This hashing algorithm is described in the article "Hashing Concepts and the Java Programming Language," by Robert Uzgalis, .COPYRGT.1996, which article is incorporated entirely herein by reference. As explained in the article, the BUZhash algorithm conventionally operates as described below using the Sketchy Algorithm Language: TABLE-US-00001 unsigned long PROC buzhash (string key); unsigned long rtab[256]={64-bit-rand, 64-bit-rand, . . . }; unsigned long h=64-bit-rand; for i from 0 to size(key) h=cshift(h,1) XOR rtab[key[1]]; return h;

Of course, those of ordinary skill in the art will appreciate that the BUZhash algorithm can be modified for different configurations of the cache 205 (e.g., different key ranges, etc.).

As discussed in the Uzgalis article, when applied to a binary key value, the BUZhash algorithm is particularly good at both generating a random number from any given key value and distributing the possible range of key values evenly in a table. Those of ordinary skill in the art will appreciate, however, that other hash algorithms known in the art may also be employed to store the state information in the cache 205. Also, it will be apparent that new hash algorithms may be developed which can be used to store state information in the cache 205.

It should be noted that the distributed cache application 405 treats all key values opaquely, and operates under the assumption that all key values are unique. That is, a unique key can only identify a single record in the cache 205. If a second record is added to the cache 205 with the same key data as an existing record, only one of the records will survive. It may be desirable, however, to use the same key data to refer to different records. For example, as previously explained, a SSL session identifier may be used as key data to identify a record with SSL resumption information. It may also be desirable to use the SSL session identifier to identify a different record, such as a record with authentication information for the user employing the client device 103 (e.g., authentication information used to determine the data that the client device's user may access from the master server device 107.

Accordingly, with various embodiments of the invention the cache API 403 may provide for the use of a table identifier to distinguish between two different records that share the same key data. With these various embodiments of the invention, the proxy application 401 specifies a table identifier value that is pre-pended to the key data as part of all calls through the cache API 403 that involve the specification of key data. This allows the proxy application 401 to, in effect, specify a virtual table to which the record identified by a particular key should be written to or read from. Of course, as will be appreciated by those of ordinary skill in the art, because all records of the cache 205 are stored in a single hash table as described above, this is only a logical construct.

Preferably, the proxy application 401 is the responsible for ensuring that each table identifier value is properly created and consistently applied. The proxy application 401 may prepend the table identifier to the key and then pass the key to the cache API 403, or, alternatively, to omit a buffer allocation operation and a copy operation, the proxy application 401 may pass the table identifier to the cache API 403 and the cache API 403 may prepend the table identifier. Because the cache API 403 treats the table identifier as part of the key data, the proxy application 401 should preferably minimize the size of this value is as much as possible. Minimizing the size of the table identifier will allow for both optimal memory usage and optimal hashing performance.

The cache memory 203 may be any type of memory medium. As will be appreciated by those of ordinary skill in the art, however, the cache memory 203 may be preferably embodied in a readable and rewritable semiconductor memory device, commonly referred to as RAM or main memory, as this type of memory device allows information to be both quickly stored and retrieved. Currently, computers that are conventionally used as server devices may have such memories that can store between 2 gigabytes and 4 gigabytes of information. Thus, approximately 2-4 million 1 kilobyte records can be stored in this type of memory device for each proxy server device 103. Of course, other types of memory medium, such as a magnetic medium or an optical medium, may alternately be employed.

According to some embodiments of the invention, the communicator application 407 provides for point-to-point (i.e., acknowledgement based) communication, such as a unicast or TCP/IP-like communication, between devices in the network. This type of communication is useful, for example, to synchronize state information between a newly initiated cache memory 203 with an existing cache memory 203, to ensure that all of the state information is accurately copied to the new cache memory 203 before it is used by its corresponding proxy application 401.

This type of point-to-point communication (e.g. unicast or TCP/IP-like communication) provided by the communicator application 407 can also be used by distributed cache application 405 to update or add individual records in the cache memories 203 of other proxy server devices 105. As discussed above, however, with the embodiment of the invention shown in FIGS. 2A and 2B, the overhead on the network resources for writing state information to each cache memory 203 increases as the number of proxy server devices 105 increases. This is because each proxy server device 105 must write new or updated state information to each cache memory 203 using a separate write process, and then receive an acknowledgement of receipt of the write command from each cache memory in reply, requiring a significant amount of network traffic and processor time for each proxy server device 105 in the network 201. More specifically, the number of data packets that must be transmitted for each communication is 2N, where N is the number of devices (e.g., proxy server devices 105) receiving the communication.

Thus, while the messages from the communicator application 407 can be individually delivered to each appropriate recipient device in the network using, e.g., point-to-point messaging, this type of communication restricts the speed and efficiency of the invention. Accordingly, with some preferred embodiments of the invention, the communicator application 407 also provides reliable multicast communication. As is known in the art, a communication technique may be considered reliable if (a) data packets transmitted according to the technique are correctly ordered and duplicates can be discarded by the receiving party, (b) the technique allows the receiving party to detect when data packets are missing from a transmission, and (c) the technique provides a repair mechanism of the receiving party to obtain data packets missing from a transmission. Multicasting, as is also well known in the art, is a procedure whereby different network devices receive a message sent to a single network address.

Therefore, the communicator application 407 may use reliable multicast transmissions to add, update, or delete state information to or from the appropriate devices in the network. By using reliable multicasting, these embodiments of the invention advantageously convey state information to a number of different devices simultaneously, simply by transmitting the state information to a single, shared multicast address. As previously noted, the process of multicasting is well known in the art and several multicasting protocols, such as the multicast transfer protocol (MTP), have been established to facilitate multicast communications.

One type of reliable multicast communication technique is the multicast communication with positive application acknowledgement. With this technique, an application receiving the multicast transmission sends an acknowledgement back to the device originating the multicast transmission after the application has successfully processed the transmitted data. This type of reliable multicast communication may preferably be employed by the communicator application 407 when relaying an ADD command from the distributed cache application 405 to add state information to other cache memories 203 in a peer configuration embodiment (or to the cache repository 303 in a multi-tier configuration embodiment). In the peer configuration embodiment, using a reliable positive-acknowledgement multicast communication technique reduces the number of data packets that must be transmitted across the network for each communication to 1+N, where N is the number of devices (e.g., proxy server devices 105) receiving the communication. That is, one communication is multicast to each of N devices, and N positive acknowledgements are transmitted back to the originating device.

While reliable positive acknowledgement multicasting allows multiple devices to reliably receive updated or new state information simultaneously, it may still require significant network resources to implement with the peer configuration. Because each device receiving a multicast message will need to individually acknowledge receipt of the communication to the network device from which the message originated, in a network with a large number of proxy server devices 105 (i.e., where N becomes large), transmitting information to each proxy server device 105 using reliable positive acknowledgement multicasting may still substantially impair the performance of the network.

For various applications of the invention, however, employing the multi-tier configuration embodiments described above can reduce the use of network resources still further. With these embodiments, new or updated state information need be transmitted to only the cache repositories 303 using a reliable, positive-acknowledgement based communication technique. The proxy server devices 105 can then obtain the new or updated state information using a less-reliable (and thus typically less expensive in terms of network resources) communication technique, or obtain the new or updated state information from a cache repository 303 when needed. Thus, by using the multi-tier configuration, the number of packets that must be transmitted across the network for each addition of new or updated state information can be reduced still further to 1+n, where n is the number of cache repositories 303 receiving the new or updated state information. Because the number n of cache repositories 303 will typically be much smaller than the number N of proxy server devices 105 in the invention, using the multi-tier configuration can substantially reduce the use of network resource, both in network traffic and processing time for individual resources, required to cache new or updated state information.

With the multi-tier configurations embodiments of the invention, the proxy server devices 105 may then receive new or updated state information using, for example, a negative acknowledgment (NACK) technique to provide reliable multicast communication, instead of the positive acknowledgment technique discussed above. With a negative acknowledgment multicast procedure, the devices receiving the multicast message do not send an acknowledgment to the originating device upon receipt of the message. Instead, each receiving device responds to the originating device only when it determines that it has missed a portion of the multicast communication.

For example, some communication protocols require that each segment of data in a communication be sequentially numbered. Thus, with the negative acknowledgement procedure, a device receiving a communication according to such a protocol a might respond to the originating device only when it recognized that it had not received one of the data segments (i.e., when it determined that it was missing a sequentially numbered data segment). Accordingly, the communicator application 407, according to various embodiments of the invention, employs this technique to provide negative acknowledgements to another device in the network when it recognizes that it has not received data from that device.

Thus, this negative acknowledgement reliable multicast arrangement can be used to deliver new or updated state information to each of the proxy server devices 105 in multi-tier configuration embodiments of the invention, thereby reducing the amount of communication traffic between the devices. Of course, both a positive acknowledgement multicast communication and a negative acknowledgement multicast communication can be accomplished using a single multicast transmission at all of the relevant receiving devices. The device sending the transmission will then wait until receiving positive acknowledgements from all of the devices designated to communicate using the positive acknowledgement technique before sending another multicast transmission. The sending device will then also respond to any negative acknowledgement it receives according to the appropriate negative acknowledgement multicast communication protocol.

Conventional negative acknowledgement reliable multicast communication techniques present an additional problem, however, sometimes referred to as "overrunning." In this situation, the transmitting device sends data faster than one or more of the receiving devices can process it, resulting in some of the transmitted data being lost. Further, the transmitting device may send out too much information to receive a negative acknowledgment from another device indicating that a portion of the communication was lost. The extent of this problem is dependent upon the flow rate of communication traffic across the network, however. When there is little communication traffic over the network, however then the device initiating the multicast communication will be able to transmit information faster without overrunning a receiving device or missing a negative acknowledgement. Likewise, when the communication traffic over the network increases, the device initiating the multicast communication should transmit data more slowly to avoid overrunning a receiving device or missing a negative acknowledgement.

To address this problem, some prior art negative acknowledgment multicast systems have proposed to set an absolute limit on the rate at which data is transmitted in a multicast communication, to ensure that a negative acknowledgement from another device is received under all circumstances. This constant-rate solution of the prior art, however, does not take into varying communication traffic flow across the network. Instead, it always operates at the lowest possible efficiency to ensure that all negative acknowledgments are received. Other prior art systems use deterministic techniques with a "master" and "token" arrangement, but these systems are relatively slow, inefficient and complex.

Figures 5A, 5B:
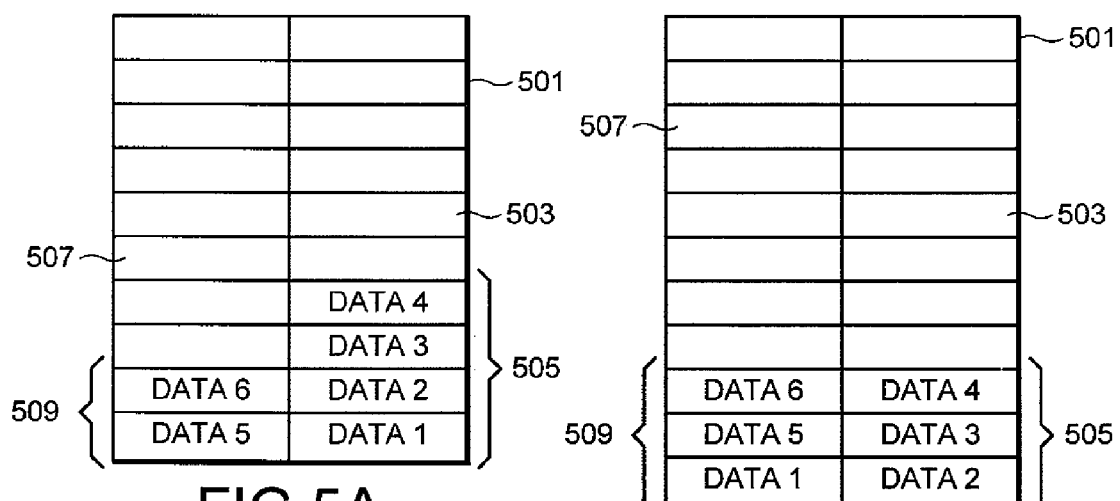
FIGS. 5A and 5B illustrate a network flow level detection technique according to an embodiment of the invention.

Accordingly, with some preferred embodiments of the invention, the communicator application 407 may provide negative acknowledgement reliable multicast communication in conjunction with a traffic flow rate detection process for determining the flow of communication traffic across the network. By accurately detecting the flow of communication traffic across the network, the communicator application 407 can correspondingly increase or decrease the rate at which it transmits data in the reliable negative acknowledgement multicast communication. This flow rate detection process will now be discussed with reference to FIGS. 5A and 5B.

As shown in these figures, the communicator application 407 has a data interface portion 501. The interface 501 includes an output queue 503 containing data segments 505 to be multicast to other devices in the network. The interface 501 also has an input queue 507 containing data segments 509 that have been received via multicast communications from other devices. According to these preferred embodiments of the invention, the communicator application 407 may include itself as a recipient of its own multicast transmission. Thus, the communicator application 407 will receive the data segment it transmitted to other devices in the network. By determining when a recently-transmitted packet of data is received back at the communicator application 407, the communicator application 407 can determine the level of traffic flow in the network. For example, with some preferred embodiments of the invention, the communicator application 407 may refrain from outputting another data segment from the output queue 503 until it has received a previously-transmitted data segment in its input queue 507.

As will be appreciated by those of ordinary skill in the art, a number of variations for this flow rate detection technique are possible. For example, the communicator application 407 may postpone sending a new data segment (e.g., Data 2 shown in FIGS. 5A and 5B) until the transmitted data segment immediately preceding it (e.g., Data 1) is received in the input queue 507 (see FIG. 5B). Alternately, the communicator application 407 may determine an average number of data segments in the input queue 507 that occur between its own transmitted data segments to ascertain the current flow conditions of traffic across the network. Numerous other modifications are also possible using the receipt of self-transmitted data segments to determine flow conditions of traffic across the network. Further, this technique can be employed even for communications that are not multicast. For example, the communicator application 407 may be able to send a copy of a point-to-point message to itself on a feedback loop. The communicator application 407 can then use the occurrence of a message in the input queue 507 that the communicator application 407 has sent to itself to determine the amount of traffic on the network.

Also, as previously explained, the same multicast transmissions can be employed to deliver messages using both a positive-acknowledgement multicast communication technique and a negative-acknowledgement multicast communication technique. It should be noted that, when the negative-acknowledgement multicast communication technique is used in conjunction with flow detection, the flow control feature used with the negative-acknowledgement multicast technique will control the operation of the positive-acknowledgement multicast technique. That is, the sending device will not send out multicast transmissions to any device, including those devices communicating with the positive-acknowledgement multicast communication technique, faster than permitted by the flow control feature.

This flow-controlled negative acknowledgment multicast communication technique may therefore preferably be provided by the communication application 407 in multi-tier configurations of the invention to distribute new and updated cache information to the proxy server devices 105 without significantly increasing the use of the network's resources, both in terms of network traffic and in processing time required by the transmitting and receiving devices. Of course, the communicator application 407 may also provide communication techniques with no reliability for various administrative functions of the proxy server 103.

Thus, by using the reliable multicast communication techniques (i.e., the positive acknowledgement multicast communication technique and the flow-controlled negative acknowledgement multicast communication technique) to deliver state information to multiple devices at the same time, state information for a session between a proxy server device 105 and a client device 103 can be efficiently cached in a plurality of different cache memories 203 and cache repositories 303. If a connection between a client device 103 and one proxy server device 105 is terminated, another proxy server device 105 can then resume the session with the client device using the cached state information.

The present invention has been described above by way of specific exemplary embodiments, and the many features and advantages of the present invention are apparent from the written description. For example, while many of the embodiments described above relate to the storage of SSL session information, other types of state information can be cached at multiple locations according to the invention. As previously noted, the state information may be TCP/IP header data for data packets transmitted during a session with the client device 103. Further, the state information may be any type of data segment information for controlling the transmission data segments between the client device 103 and the proxy server device 105 according to any communication protocol.

Also, as previously noted, the state information may any type of identification and/or authentication information. For example, the master server device 107 may include information that is accessible to only specified persons. Thus, when a user employs a client device 103 to communicate with the master server device 107 through a session with a proxy server device 105, the proxy server device 105 may receive a user name and password to authenticate the user's identity. With this arrangement, if the connection for a session between the client device 103 and the proxy server device 105 is terminated, the client device 103 can reinitiate the session with another proxy server device 105 according to the embodiments of the invention described above. The user, however, will still have to resubmit his or her user name and password to repeat the authentication process for the master server 107. Accordingly, alternate embodiments of the invention may store a user's user name and password as state information in the cache 205 at multiple locations according to the invention. As will be appreciated by those of ordinary skill in the art, the user's authentication information can be stored in the cache 205 according to the associated SSL session identifier, or with any other appropriate key.

Still further, various embodiments of the invention may omit the master server device 107. For example, the proxy server devices 105A, 105B, 105C, 105D . . . 105φ may be server devices employed without the master server 107 to maintain a Web site. If the Web site is one from which items are purchased or otherwise obtained, the state information may include items designated for purchase from the Web site or other purchase information for a user employing a client device 103. Thus, this information may include a billing address of the user, financial transaction information for the user, such as a credit card account or electronic cash information, delivery information, etc. Thus, if the connection for a session between a client device 103 and a proxy server device 105 is terminated, a user will not have to redesignate the items he or she wishes to receive or resubmit his or her purchase information. Instead, the user's client device 103 can reinitiate the session with another proxy server device 103 having access to the state information for the session.

Therefore, it is intended that the appended claims cover all such features and advantages of the invention. Further, since numerous modifications and changes will readily occur to those skilled in the art, the specification is not intended to limit the invention to the exact construction and operation ad illustrated and described. For example, the invention may include any one or more elements from the apparatus and methods described herein in any combination or subcombination.

Additionally, although the present invention has been described using a particular series of transactions and steps, it should be apparent to those skilled in the art that the scope of the present invention is not limited to the described series of transactions and steps. There is inherent flexibility in creating the logic, system flow, tables, and data structures used for programming the present invention. Data structures and values upon which calculations are performed may be explicit, derived from other data, imported from other sources, or result from program calculations or logical operations, all without departing from the spirit or limiting the scope of the invention. The algorithms for indexing, searching and data processing in this patent may be substituted or modified to support various performance and/or systems integration requirements, all without deviating from the spirit or limiting the scope of the invention.

Further, while the present invention has been described using a particular combination of hardware and software, it should be recognized that other combinations of hardware and software are also within the scope of the present invention. The present invention may be implemented only in hardware or only in software or using combinations thereof. The specification and drawings are, accordingly, to be regarded in an illustrative rather than a restrictive sense. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A system for maintaining session based communications with a client computer, the system comprising:
    a first server that communicates with a client computer, wherein the first server includes a copy of a cache memory storing at least a portion of state information for a session corresponding to a session between the first server and the client computer; and
    a second server including a copy of the cache memory stored at the first server, wherein the client computer establishes a new session with the second server when a connection with the first server terminates, and wherein the second server requests an additional portion of state information from a third server when the additional portion of state information is not immediately present at the second server upon establishment of the connection with the client computer and the additional portion of state information is required to properly conduct the session.

2. The system of claim 1, wherein the second server sequentially requests the additional portions of state information from the third server until the required additional state information is received in reply.

3. The system of claim 1, wherein the first server further includes:
    a proxy application stored in memory and executable by the first server to establish a secure communication with the client computer;
    a distributed cache application programming interface executable to retrieve information from the cache memory and pass the information to a distributed cache application; and
    a distributed cache application stored in memory and executable to store information in the cache memory.

4. The system of claim 3, further comprising a communicator application stored in memory and executable to allow communication between the distributed cache application and the second server.

5. The system of claim 1, wherein the state information is credential information.

6. The system of claim 5, wherein the credential information includes Secure Sockets Layer (SSL) session identifiers.

7. The system of claim 6, wherein the credential information includes authentication information.

8. The system of claim 1, wherein the state information includes Transmission Control/Internet Protocol (TCP/IP) header information.

* * * * *